(12) United States Patent
Adachi et al.

(10) Patent No.: US 12,160,934 B2
(45) Date of Patent: Dec. 3, 2024

(54) HEATER CONTROL DEVICE

(71) Applicant: TOYOTA JIDOSHA KABUSHIKI KAISHA, Toyota (JP)

(72) Inventors: Takahiro Adachi, Chiryu (JP); Tatsuyoshi Nakajima, Nagoya (JP); Takahiro Miyadoh, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 811 days.

(21) Appl. No.: 17/376,729

(22) Filed: Jul. 15, 2021

(65) Prior Publication Data
US 2022/0046760 A1 Feb. 10, 2022

(30) Foreign Application Priority Data

Aug. 7, 2020 (JP) .................................. 2020-135137

(51) Int. Cl.
*H05B 1/02* (2006.01)
*B60S 1/02* (2006.01)
*H05B 3/84* (2006.01)

(52) U.S. Cl.
CPC ............ *H05B 1/0236* (2013.01); *B60S 1/026* (2013.01); *H05B 3/84* (2013.01); *H05B 2203/035* (2013.01)

(58) Field of Classification Search
CPC .... H05B 1/0236; H05B 3/84; H05B 2203/03; B60R 11/04; B60R 2011/0026; B60S 1/026; B60S 1/0818; B60S 1/0896; B60S 1/0848

See application file for complete search history.

(56) References Cited

U.S. PATENT DOCUMENTS

2019/0193684 A1* 6/2019 Oikawa .................. B60R 11/04

FOREIGN PATENT DOCUMENTS

| JP | 5-193341 A | 8/1993 |
| JP | 7-285312 A | 10/1995 |
| JP | 2015-74364 A | 4/2015 |
| JP | 2015-074364 A | 4/2015 |
| JP | 2017-114154 A | 6/2017 |
| JP | 2019-116150 A | 7/2019 |

* cited by examiner

*Primary Examiner* — Brian W Jennison
(74) *Attorney, Agent, or Firm* — Sughrue Mion, PLLC

(57) ABSTRACT

A heater control device includes a camera sensor configured to capture an image of an outside of a vehicle through an image capturing transparent region of a window glass, and a camera heater configured to heat the image capturing transparent region. The heater control device is configured to: apply, to a correlation which is set in advance between an outside temperature, a vehicle speed, and energization electric power, and a temperature of the image capturing transparent region corresponding to the outside temperature, the vehicle speed, and the energization electric power, the outside temperature at a current time, the vehicle speed at the current time, and a target temperature equal to or higher than a dew-point temperature, to thereby determine defogging electric power so that the temperature of the image capturing transparent region is prevented from falling below the dew-point temperature.

3 Claims, 8 Drawing Sheets

HEATER CONTROL DEVICE

BACKGROUND

Technical Field

The present disclosure relates to a heater control device which includes a camera sensor configured to capture an image of an outside of a window glass from an inside of the window glass through an image capturing transparent region being a part of the window glass of a vehicle and a camera heater configured to heat the image capturing transparent region by being energized, and is configured to control the energization to the camera heater.

Related Art

Hitherto, there has been known a heater control device configured to control energization to a heater configured to heat a window glass of a vehicle. This heater generates heat by being energized.

A heater control device described in Japanese Patent Application Laid-open No. 2017-114154 (hereinafter referred to as "related-art device") controls energization to a heater for heating a window glass (front window).

The related-art device executes deicing control of energizing the heater in order to melt ice attached to the window glass. In more detail, the related-art device executes the deicing control during a period from "a time at which a heater switch is operated" to "a time at which a temperature (glass temperature) of the windows glass exceeds a predetermined value."

SUMMARY

Incidentally, a camera sensor for capturing an image of an outside of the vehicle is mounted inside the vehicle. Such a camera sensor captures the image of the outside of the vehicle from the inside of the vehicle through an image capturing transparent region being a partial region of the window glass. When an outside temperature being a temperature outside the vehicle is low, and the air inside the vehicle is warmed by an air conditioner, a temperature in the image capturing transparent region falls below a dew-point temperature, and the image capturing transparent region is fogged. When the image capturing transparent region is fogged, the camera sensor captures the fogging, and cannot accurately capture an image of the outside of the vehicle. To deal with this problem, it is conceivable to provide a camera heater configured to heat the image capturing transparent region in order to remove or prevent the fogging in the image capturing transparent region.

The related-art device executes control to deice the window glass, and does not execute control (hereinafter referred to as "defogging control") for removing or preventing the fogging of the window glass. In the defogging control, it is required to prevent the glass temperature from falling below the dew-point temperature, but the related-art device executes the energization to the heater without considering the dew-point temperature. As a result, there is a possibility that the related-art device cannot remove or prevent the fogging of the image capturing transparent region, and there is also a possibility that the related-art device increases the glass temperature to a temperature that is too high with respect to the dew-point temperature, and thus consumes wasteful electric power. Further, the related-art device is required to include a sensor for detecting the glass temperature, and a manufacturing cost thereof consequently increases.

The present disclosure has been made in view of the above-mentioned problems. That is, one object of the present disclosure is to provide a heater control device capable of, without requiring a sensor for detecting a glass temperature, increasing a possibility that fogging of an image capturing transparent region can be removed or prevented, and reducing a possibility that a camera heater consumes wasteful electric power.

A heater control device (hereinafter referred to as "device of the present disclosure") according to at least one embodiment of the present disclosure includes: a camera sensor (22) configured to capture an image of an outside of a vehicle VA from an inside of the vehicle through an image capturing transparent region (101a) being a partial region of a window glass (101, 102) of the vehicle; a camera heater (24) configured to generate heat by being energized, and to heat the image capturing transparent region with the generated heat; and a control unit (20) configured to control the energization to the camera heater, and the control unit is configured to: estimate a dew-point temperature of the image capturing transparent region based on an inside temperature (Tb) being a temperature inside the vehicle and an inside humidity (H) being a humidity inside the vehicle (Step 625); apply, to a correlation (refer to FIG. 4 and Expression (1)) which is set in advance between an outside temperature (Ta) being a temperature outside the vehicle, a vehicle speed (Vs) being a speed of the vehicle, and energization electric power (Wc) for energizing the camera heater, and a temperature (Tg) of the image capturing transparent region corresponding to the outside temperature, the vehicle speed, and the energization electric power, the outside temperature at a current time, the vehicle speed at the current time, and a target temperature equal to or higher than the dew-point temperature, to thereby determine defogging electric power for maintaining the temperature of the image capturing transparent region at the target temperature so that the temperature of the image capturing transparent region is prevented from falling below the dew-point temperature (Step 630 to Step 640, and Step 805); and energize the camera heater at the defogging electric power (Step 700 to Step 795).

According to the device of the present disclosure, the dew-point temperature is estimated based on the inside temperature and the inside humidity, and the camera heater is energized at the defogging electric power required to maintain the temperature of the image capturing transparent region at the target temperature equal to or higher than the dew-point temperature so that the temperature of the image capturing transparent region is prevented from falling below the dew-point temperature. This defogging electric power is determined through use of the correlation between the outside temperature, the vehicle speed, and the energization electric power, and the temperature of the image capturing transparent region corresponding thereto, and can thus be set to an accurate value required to maintain the temperature of the image capturing transparent region at the target temperature. When the camera heater is being energized at the defogging electric power determined in this way, the temperature of the image capturing transparent region is maintained at the target temperature, and thus the temperature of the image capturing transparent region does not fall below the dew-point temperature. Consequently, the temperature of the image capturing transparent region can be prevented from falling below the dew-point temperature, and the image capturing transparent region can thus be prevented from being fogged. Even when the image capturing transparent region is fogged, the fogging can be removed. Further, the temperature of the image capturing transparent region can be prevented from increasing to a temperature that is excessively higher than the dew-point temperature, and the camera heater can thus be prevented from consuming wasteful electric power. Further, according to the device of the present disclosure, it is not required to detect the temperature of the image capturing transparent region, and a sensor for detecting the glass temperature is thus not required. The increase in manufacturing cost can consequently be prevented.

In one aspect of the device of the present disclosure, the correlation is represented by an equation (Expression (1)) in which the temperature of the image capturing transparent region is equal to a sum of a value obtained by multiplying the outside temperature by a first vehicle speed coefficient corresponding to the vehicle speed, a value obtained by multiplying the energization electric power being the electric power for energizing the camera heater by a second vehicle speed coefficient corresponding to the vehicle speed, and a third vehicle speed coefficient corresponding to the vehicle speed, and the control unit is configured to determine, as the defogging electric power, the energization electric power obtained by setting the first vehicle speed coefficient, the second vehicle speed coefficient, and the third vehicle speed coefficient of the equation to values corresponding to the vehicle speed at the current time (Step 630), assigning the target temperature to the temperature of the image capturing transparent region of the equation, and assigning the outside temperature at the current time to the outside temperature of the equation (Step 635, Step 640, and Step 805).

As a result, the defogging electric power is determined through use of the equation which is based on the correlation among the temperature of the image capturing transparent region, the outside temperature, the vehicle speed, and the energization electric power, and more accurate defogging electric power can thus be obtained.

In one aspect of the device of the present disclosure, the control unit is configured to: divide a predetermined unit period (Tcyc) into a non-energization period (Toff) in which the camera heater is prevented from being energized and an energization period (Ton) in which a constant voltage (Vc) is applied to the camera heater to energize the camera heater (Step 710 and Step 720), and start a new predetermined unit period when the predetermined unit period ends, to thereby control the energization to the camera heater; and determine the non-energization period and the energization period so that the energization electric power matches the defogging electric power (Step 635 and Step 640).

As a result, when the voltage applied to the camera heater is constant, and the unit period is divided into the non-energization period and the energization period to energize the camera heater, the non-energization period and the energization period can be determined so that the energization electric power matches the defogging electric power.

In one aspect of the device of the present disclosure, the control unit is configured to: change a voltage to be applied to the camera heater; and determine the voltage so that the energization electric power matches the defogging electric power (Step 805).

As a result, when the voltage to be applied to the camera heater is changeable, the voltage can be determined so that the energization electric power matches the defogging electric power.

In the above description, for easier understanding of the present disclosure, the terms and/or reference symbols used in at least one embodiment described below are enclosed in parentheses and assigned to the components of the present disclosure corresponding to the at least one embodiment. However, the constituent elements of the present disclosure are not limited to the at least one embodiment defined by the terms and/or reference symbols. Other objects, other features, and accompanying advantages of the present disclosure are easily understandable from the description of the at least one embodiment of the present disclosure to be given with reference to the following drawings.

DESCRIPTION OF THE EMBODIMENTS

Description is now given of a heater control device (hereinafter referred to as "this control device") 10 according to at least one embodiment of the present disclosure with reference to the drawings. This control device 10 is applied to a vehicle VA of FIG. 1. This control device 10 includes an ECU 20.

"ECU" is an abbreviation for an electric control unit. The ECU is an electronic control circuit including a microcomputer as a main component. The microcomputer includes, for example, a CPU, a ROM, a RAM, and an interface. The CPU executes instructions (routines) stored in the memory (ROM) to implement various functions. Some of the functions implemented by the ECU 20 may be implemented by another ECU.

Figure 2:
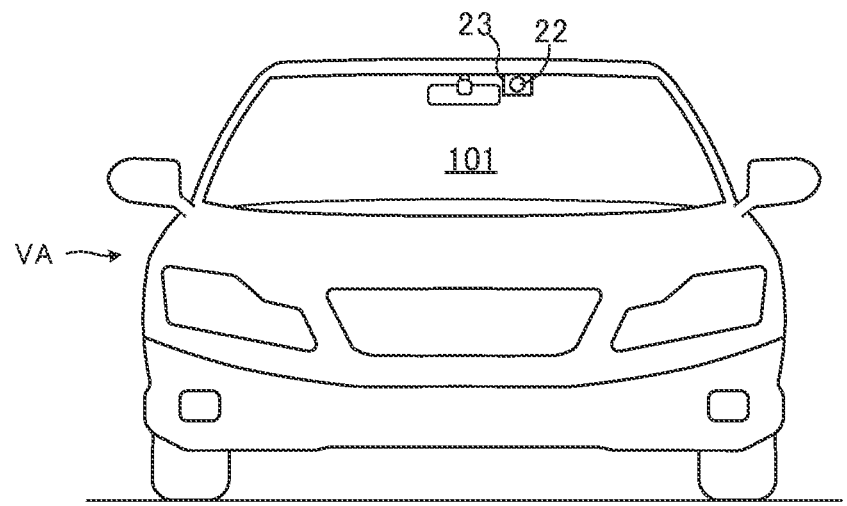
FIG. 2 is a front view of a vehicle.
Figure 3:
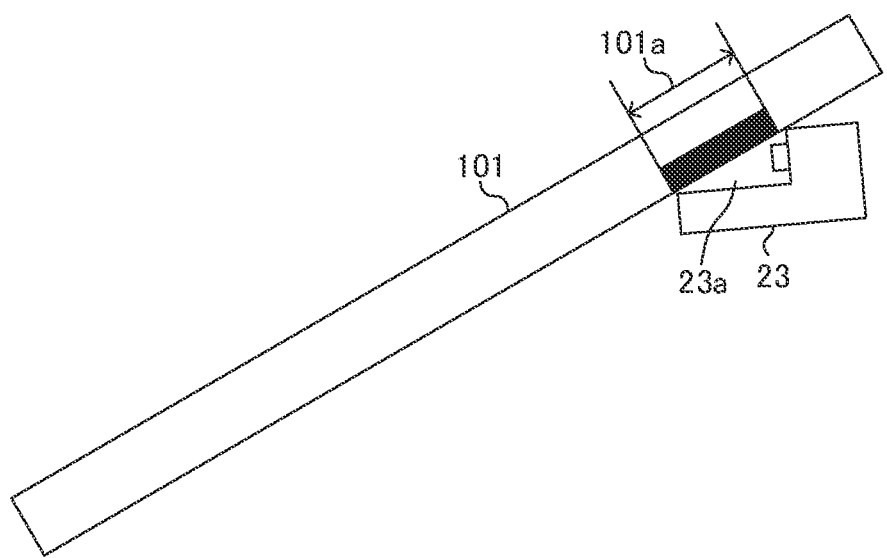
FIG. 3 is a side view of a front window of the vehicle.

The vehicle VA includes a camera sensor 22 and a camera heater 24. The camera sensor 22 is a widely-known CCD camera or CMOS camera. As illustrated in FIG. 2 and FIG. 3, the camera sensor 22 is arranged inside the vehicle VA, that is, inside a front window 101 being one of front window glasses of the vehicle VA. The camera sensor 22 is supported by the vehicle VA through a bracket (support member) 23. The bracket 23 is made of a resin material. The camera sensor 22 captures an image of the outside of the vehicle VA from the inside of the vehicle VA through an image capturing transparent region 101a (see FIG. 3) being a part of the front window 101.

Figure 1:
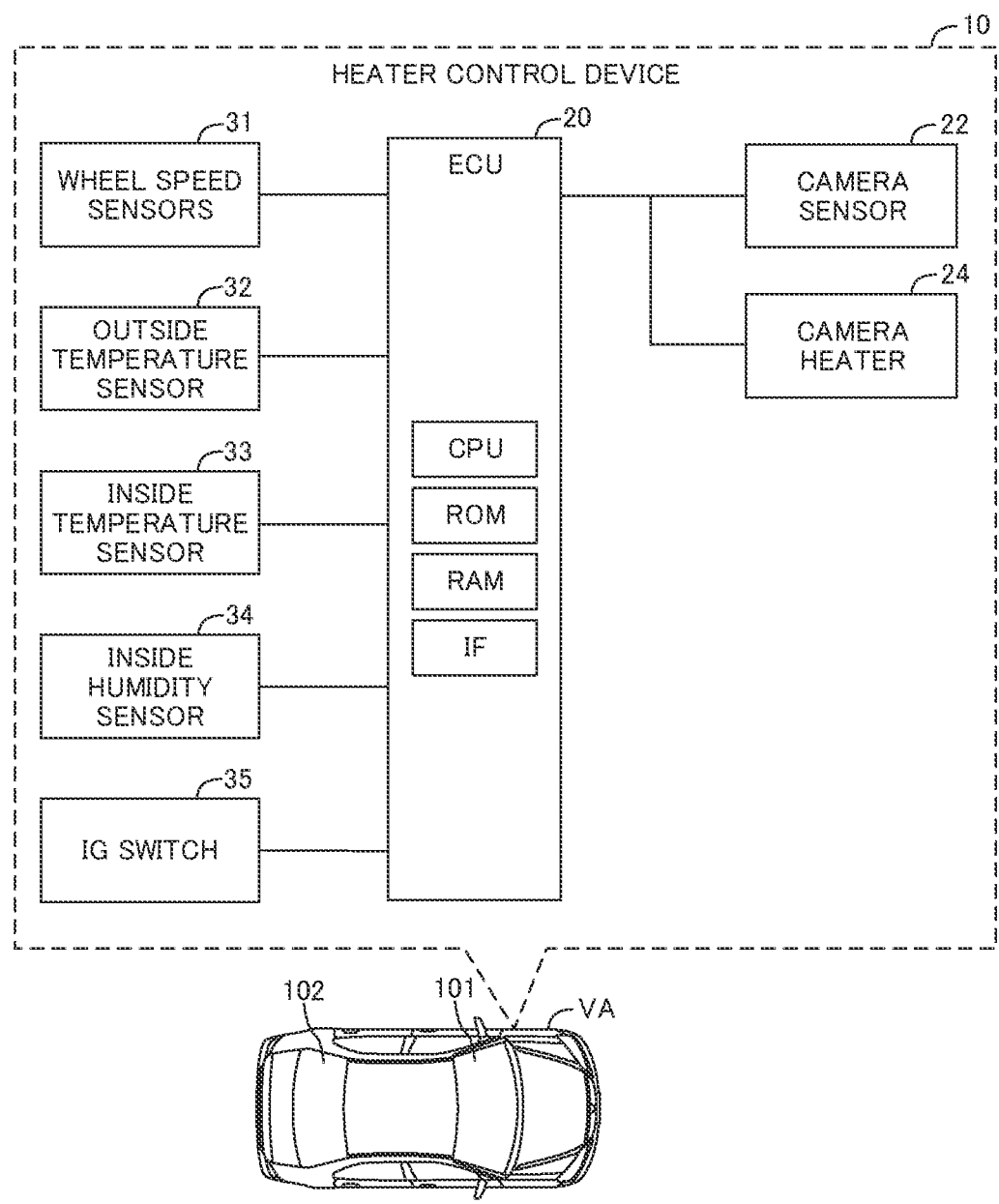
FIG. 1 is a schematic configuration diagram of a heater control device according to at least one embodiment of the present disclosure.

As illustrated in FIG. 1, the camera sensor 22 is connected to the ECU 20. The ECU 20 executes driving assist control based on image data on the image captured by the camera sensor 22. The driving assist control is control for assisting in driving of a driver of the vehicle VA. As an example of the driving assist control, there exists collision prevention control and adaptive cruise control (ACC). In the collision prevention control, the ECU 20 detects an obstacle that possibly collides with the vehicle VA based on the image data, and warns the driver of the vehicle VA before the collision with the obstacle, to thereby cause the driver to execute deceleration of the vehicle VA or the like. The ACC is control executed by the ECU 20 to follow a preceding vehicle without requiring operations of an accelerator pedal (not shown) and a brake pedal (not shown) by the driver while maintaining an inter-vehicle distance, which is a distance between the vehicle VA and "a preceding vehicle, which is positioned forward of the vehicle VA, and is detected based on the image data," to be constant.

The camera heater 24 is an electric heating wire embedded in the image capturing transparent region 101a of the front window 101 (see FIG. 3). As illustrated in FIG. 3, the image capturing transparent region 101a is surrounded by the bracket 23, which supports the camera sensor 22, and has a cross section of an L shape. As described above, the image capturing transparent region 101a is surrounded by the bracket 23, and it is thus difficult to heat the image capturing transparent region 101a through use of air blown out by an air conditioner (not shown). As a result, the camera heater 24 described above is configured to heat the image capturing transparent region 101a.

As illustrated in FIG. 1, the camera heater 24 is connected to the ECU 20, and is configured to be set by the ECU 20 to any one of an ON (energization) state and an OFF (non-energization or shutoff) state.

When the camera heater 24 is energized, the image capturing transparent region 101a (see FIG. 3) is heated with heat generated by the camera heater 24. As a result, when the image capturing transparent region 101a is fogged by moisture, the fogging is to be removed. When the image capturing transparent region 101a is not fogged, the image capturing transparent region 101a is to be prevented from being fogged. The control, by the ECU 20, of energizing the camera heater 24 in order to remove or prevent fogging of the image capturing transparent region 101a is referred to as "defogging control."

The camera heater 24 may heat a space 23a (see FIG. 3) surrounded by the bracket 23, to thereby be capable of heating the image capturing transparent region 101a. In this case, the camera heater 24 may be arranged in the camera sensor 22 supported by the bracket 23.

The vehicle VA includes wheel speed sensors 31, an outside temperature sensor 32, an inside temperature sensor 33, an inside humidity sensor 34, and an ignition switch (ready switch) (hereinafter referred to as "IG switch") 35. Those components are connected to the ECU 20.

Each of the plurality of wheel speed sensors 31 is provided for each wheel of the vehicle VA. Each wheel speed sensor 31 generates a wheel pulse signal each time a corresponding wheel rotates by a predetermined angle. The ECU 20 counts the number of pulses in a unit period of the wheel pulse signal transmitted from each wheel speed sensor 31, and acquires a rotation speed (wheel speed) of each wheel based on the number of pluses. The ECU 20 acquires a vehicle speed Vs indicating the speed of the vehicle VA based on the wheel speed of each wheel. As an example, the ECU 20 acquires an absolute value of an average value of the wheel speeds of the four wheels as the vehicle speed Vs.

The outside temperature sensor 32 detects the temperature outside the vehicle VA (outside a cabin), and outputs a signal indicating this temperature (hereinafter referred to as "outside temperature") Ta. The ECU 20 acquires the outside temperature Ta based on the signal output by the outside temperature sensor 32.

The inside temperature sensor 33 detects the temperature inside the vehicle VA (inside the cabin), and outputs a signal indicating this temperature (hereinafter referred to as "inside temperature") Tb. The ECU 20 acquires the inside temperature Tb based on the signal output by the inside temperature sensor 33.

The inside humidity sensor 34 detects the humidity inside the cabin, and outputs a signal indicating this humidity (hereinafter referred to as "inside humidity") H. The ECU 20 acquires the inside humidity H based on the signal output by the inside humidity sensor 34.

When the IG switch 35 is set to an ON position by the driver, a drive source (for example, internal combustion engine or electric motor) (not shown) is started, and the state of the drive source is consequently changed to an operation state. When the IG switch 35 is set to an OFF position by the driver, the state of the drive source is changed from the operation state to a non-operation state. The drive source in the operation state can apply a driving force to the vehicle VA in accordance with an operation amount of an acceleration operating element (not shown). The drive source in the non-operation state cannot apply the driving force to the vehicle VA even when the acceleration operating element is operated. The state in which the IG switch 35 is set to the ON position (that is, the state in which the drive source is in the operation state) is sometimes referred to as "ignition ON." The state in which the IG switch 35 is set to the OFF position (that is, the state in which the drive source is in the non-operation state) is sometimes referred to as "ignition OFF." Further, in a case in which the IG switch 35 is set to the ON position, when an execution condition described later is satisfied, the ECU 20 starts the execution of the defogging control.

<Overview of Operation>

This control device 10 determines, based on a dew-point temperature Td determined based on the inside temperature Tb and the inside humidity H, the outside temperature Ta, and the vehicle speed Vs, a defogging electric power Wc being electric power required to maintain the temperature of the image capturing transparent region 101a at the dew-point temperature Td so that the temperature of the image capturing transparent region 101a is prevented from falling below the dew-point temperature Td. After that, in the defogging control, this control device 10 energizes the camera heater 24 so that the electric power for energizing the camera heater 24 matches the defogging electric power Wc.

Figure 4:
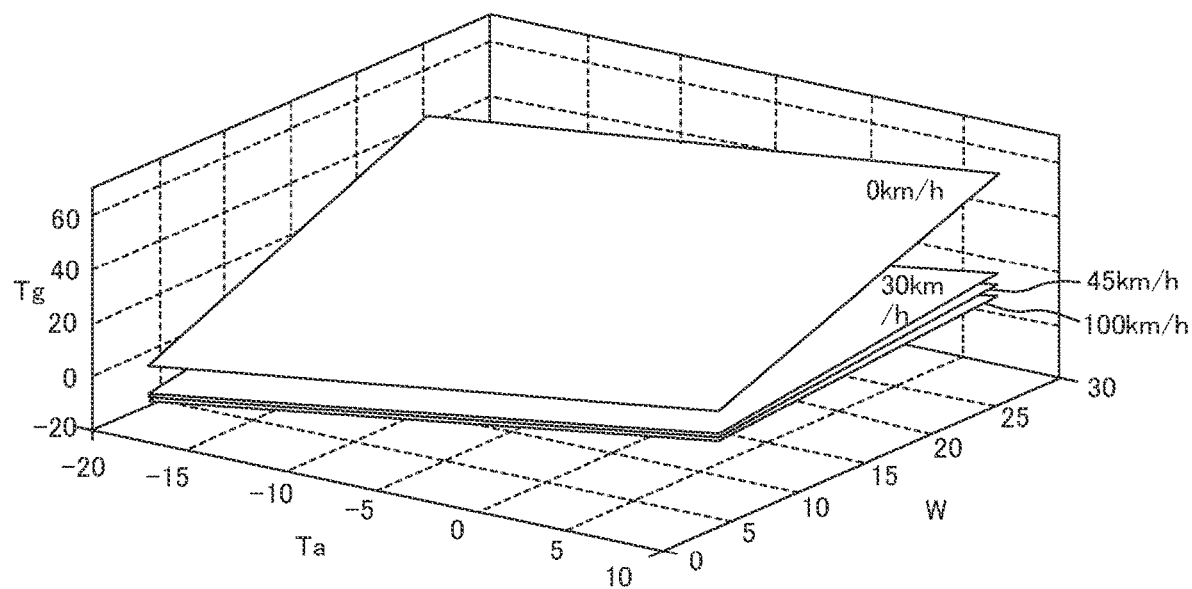
FIG. 4 is a graph for showing a correlation among a glass temperature, an outside temperature, a vehicle speed, and energization electric power.

The inventors of the present disclosure executed an experiment for measuring the temperature Tg of a window glass (glass temperature) observed when the camera heater 24 was energized at a predetermined electric power W under an environment at the outside temperature Ta and the vehicle speed Vs while changing the outside temperature Ta, the vehicle speed Vs, and the energization electric power W for the camera heater 24. From this experiment, the inventors of the present disclosure found that there is a correlation of FIG. 4 among the outside temperature Ta, the vehicle speed Vs, the glass temperature Tg, and the energization electric power W. When the correlation of FIG. 4 is formulated through use of a multiple regression analysis, the glass temperature Tg can be given by an equation (Expression (1)).

$$Tg = Ca \times Ta + Cb \times W + Cc \quad (1)$$

The symbol "Ca" of Expression (1) represents a first vehicle speed coefficient. The symbol "Cb" represents a second vehicle speed coefficient. The symbol "Cc" represents a third vehicle speed coefficient. The first vehicle speed coefficient Ca to the third vehicle speed coefficient Cc have values that change in accordance with the vehicle speed Vs, and the values thereof increase as the vehicle speed Vs increases.

Expression (2) is obtained from Expression (1).

$$W = \frac{Tg - Ca \times Ta - Cc}{Cb} \quad (2)$$

The defogging electric power Wc being a target electric power in the defogging control is obtained by setting the first vehicle speed coefficient Ca to the third vehicle speed coefficient Cc corresponding to the vehicle speed Vs at the current time, assigning the dew-point temperature Td to the glass temperature Tg, and assigning the outside temperature Ta at the current time to the outside temperature Ta. That is, the defogging electric power Wc required to maintain the glass temperature Tg at the dew-point temperature Td is obtained at the vehicle speed Vs at the current time and the outside temperature Ta at the current time.

As can be understood from the description given above, with this control device 10, Expression (2) is used to determine the defogging electric power Wc, and the temperature of the image capturing transparent region can thus be maintained at the dew-point temperature Td, and can thus be prevented from falling below the dew-point temperature Td. As a result, the fogging of the image capturing transparent region 101a can reliably be removed or prevented. Moreover, the image capturing transparent region 101a is not heated to a temperature that is excessively higher than the dew-point temperature Td, and thus a possibility that the camera heater 24 wastefully consumes the electric power can also be reduced. Further, the dew-point temperature Td estimated based on the inside temperature Tb and the inside humidity H, the outside temperature Ta, and the vehicle speed Vs are used to determine the defogging electric power Wc, and the temperature of the image capturing transparent region 101a is thus not used to determine the defogging electric power Wc described above. As a result, it is not required to provide a sensor for detecting the temperature of the image capturing transparent region 101a, and an increase in manufacturing cost can thus be prevented.

Operation Example

Figure 5:
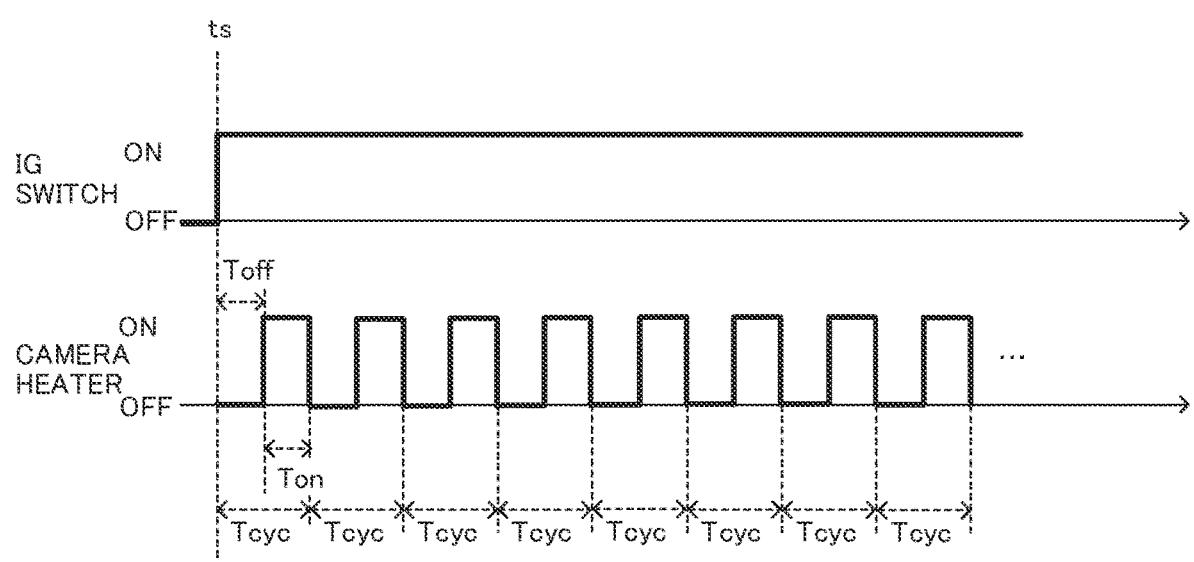
FIG. 5 is a timing chart for showing an OFF period and an ON period of defogging control.

With reference to FIG. 5, description is given of an operation example of this control device 10.

As described above, the ECU 20 determines whether or not the execution condition for the defogging control is satisfied at a time "ts" at which the IG switch 35 is set to the ON position. This execution condition is a condition that the outside temperature Ta is equal to or lower than a threshold temperature Tath. For example, the threshold temperature Tath is set in advance to a dew-point temperature (10° C.) at the time when the inside temperature Tb is a predetermined temperature (25° C.) and the inside humidity H is a predetermined humidity (40%).

The ECU 20 starts the defogging control when the execution condition is satisfied. In the example of FIG. 5, the ECU 20 determines that the execution condition is satisfied at the time "ts", and thus starts the defogging control.

In the defogging control, the ECU 20 divides a unit period Tcyc into an OFF period (non-energization period) Toff and an ON period (energization period) Ton. The ECU 20 does not energize the camera heater 24 when the current time is in the OFF period Toff, and the ECU 20 energizes the camera heater 24 when the current time is in the ON period Ton. When the ECU 20 energizes the camera heater 24, the ECU 20 applies a predetermined constant voltage Vc to the camera heater 24.

The ECU 20 uses Expression (2) immediately before the start of the unit period Tcyc to determine the defogging electric power Wc, and determines "a duty ratio D representing the ratio of the ON period Ton to the unit period Tcyc" so that the camera heater 24 is energized at the defogging electric power Wc.

A detailed description is now given of the determination of the duty ratio D.

The electric power W of the camera heater 24 is given by Expression (3).

$$W = D \times \frac{Vc^2}{R} \quad (3)$$

The symbol "Vc" of Expression (3) represents the constant voltage to be applied to the camera heater 24 during the ON period. The symbol "R" of Expression (3) represents a resistance value of the camera heater 24.

Expression (4) is obtained by assigning Expression (3) to Expression (2) and arranging Expression (2) to solve the expression for the duty ratio D. The ECU 20 determines the first vehicle speed coefficient Ca to the third vehicle speed coefficient Cc in accordance with the vehicle speed Vs at the current time. After that, the ECU 20 applies the first vehicle speed coefficient Ca to the third vehicle speed coefficient Cc, "the dew-point temperature Td estimated based on the inside temperature Tb at the current time and the inside humidity H at the current time," and the outside temperature Ta to Expression (4), to thereby determine the duty ratio D.

$$D = \frac{R(Tg - Ca \times Ta - Cc)}{Cb \times Vc^2} \quad (4)$$

Duty ratio determination processing for determining the duty ratio D is executed each time the unit period Tcyc elapses. When the unit period Tcyc ends, and a new unit period Tcyc starts in the defogging control, the new unit period Tcyc is assigned to the OFF period Toff and the ON period Ton based on the duty ratio D determined through the duty ratio determination processing executed immediately before. The defogging control ends at a time at which the IG switch 35 is set to the OFF position or at a time at which the outside temperature Ta exceeds the threshold temperature Tath.

(Specific Operation)

<Duty Ratio Determination Routine>

The CPU of the ECU 20 ("CPU" hereinafter refers to the CPU of the ECU 20 unless otherwise specified) executes a duty ratio determination routine illustrated in a flowchart of FIG. 6 each time the unit period Tcyc elapses.

Figure 6:
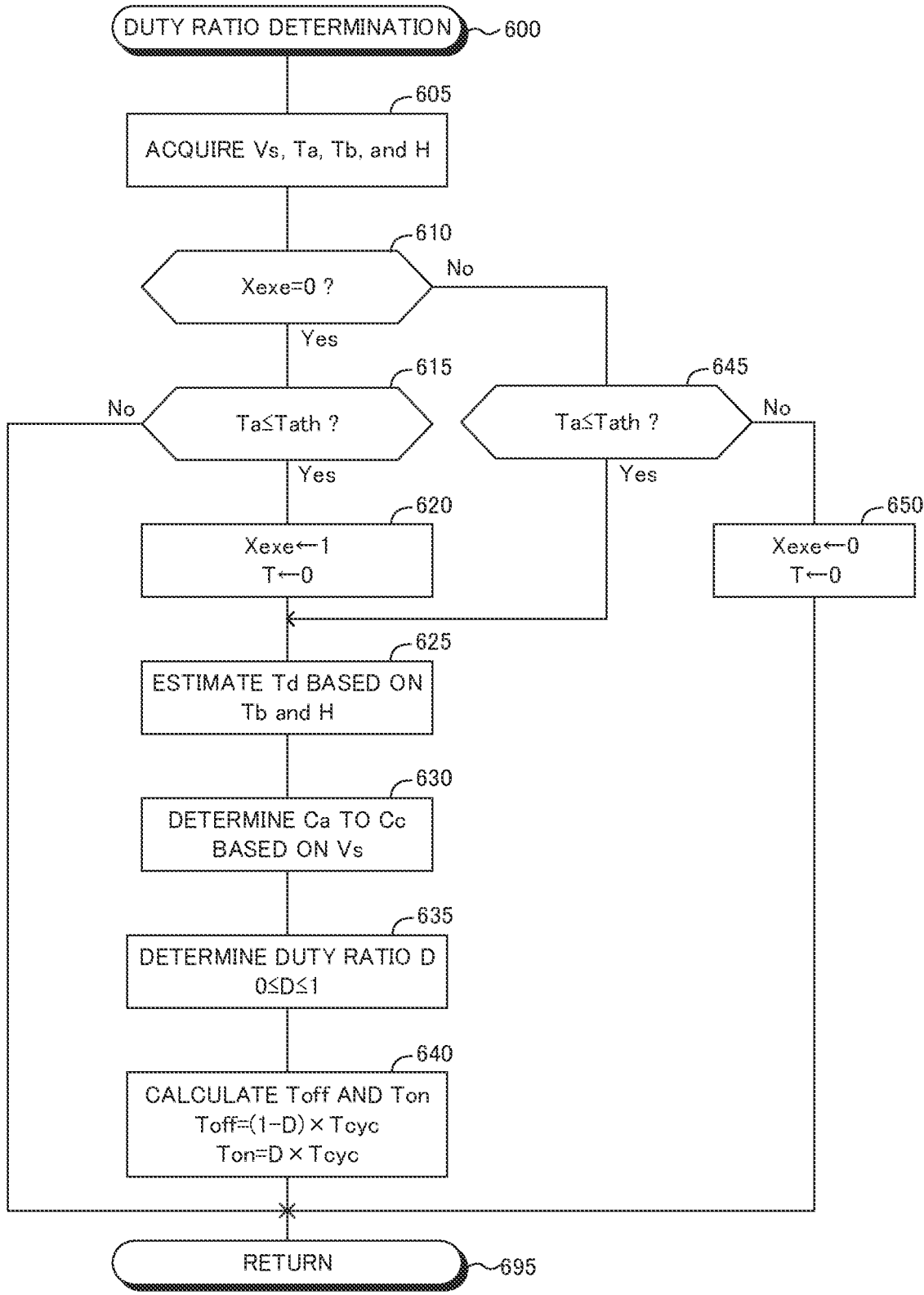
FIG. 6 is a flowchart for illustrating a duty ratio determination routine to be executed by a CPU (hereinafter simply referred to as "CPU") of an ECU.

Thus, the CPU starts processing from Step 600 of FIG. 6 at a predetermined timing, and executes processing of Step 605 and Step 610 in the stated order.

Step 605: The CPU acquires "the vehicle speed Vs, the outside temperature Ta, the inside temperature Tb, and the inside humidity H" at the current time.

Step 610: The CPU determines whether or not the value of an execution flag Xexe is "0".

The value of the execution flag Xexe is set to "1" when the outside temperature Ta is equal to or lower than the threshold temperature Tath, and is set to "0" when the outside temperature Ta is higher than the threshold temperature Tath. Further, the value of the execution flag Xexe is set to "0" through an initial routine executed by the CPU when the IG switch 35 is set from the OFF position to the ON position.

When the value of the execution flag Xexe is "0", the CPU makes a determination of "Yes" in Step 610, and proceeds to Step 615. In Step 615, the CPU determines whether or not the outside temperature Ta is equal to or lower than the threshold temperature Tath.

When the outside temperature Ta is higher than the threshold temperature Tath, the CPU makes a determination of "No" in Step 615, proceeds to Step 695, and temporarily finishes this routine.

Meanwhile, when the CPU proceeds to Step 615, and the outside temperature Ta is equal to or lower than the threshold temperature Tath, the CPU makes a determination of "Yes" in Step 615, and executes processing of Step 620 to Step 640 in the stated order. After that, the CPU temporarily finishes this routine.

Step 620: The CPU sets the value of the execution flag Xexe to "0", and sets the value of a timer T described below to "0".

Step 625: The CPU estimates the dew-point temperature Td based on the inside temperature Tb and the inside humidity H. The dew-point temperature Td is a temperature corresponding to an amount of saturated water vapor matching an amount of water vapor per predetermined unit volume obtained based on the amount of saturated water vapor at the inside temperature Tb and the inside humidity H.

Step 630: The CPU determines the first vehicle speed coefficient Ca to the third vehicle speed coefficient Cc based on the vehicle speed Vs. For example, there are set, in advance, four values (Ca1 to Ca4, Cb1 to Cb4, and Cc1 to Cc4) in accordance with the vehicle speed Vs for each of the first vehicle speed coefficient Ca to the third vehicle speed coefficient Cc. The CPU determines each of the first vehicle speed coefficient Ca to the third vehicle speed coefficient Cc to any one of the corresponding four values in accordance with the vehicle speed Vs as described below.

When the vehicle speed Vs is equal to or higher than "0 km/h" and lower than "30 km/h," the first vehicle speed coefficient Ca to the third vehicle speed coefficient Cc are determined to be Ca1 to Cc1, respectively.

When the vehicle speed Vs is equal to or higher than "30 km/h" and lower than "45 km/h," the first vehicle speed coefficient Ca to the third vehicle speed coefficient Cc are determined to be Ca2 to Cc2, respectively.

When the vehicle speed Vs is equal to or higher than "45 km/h" and lower than "100 km/h," the first vehicle speed coefficient Ca to the third vehicle speed coefficient Cc are determined to be Ca3 to Cc3, respectively.

When the vehicle speed Vs is higher than "100 km/h," the first vehicle speed coefficient Ca to the third vehicle speed coefficient Cc are determined to be Ca4 to Cc4, respectively.

As the vehicle speed Vs increases, the values of the first vehicle speed coefficient Ca to the third vehicle speed coefficient Cc increase.

Step 635: The CPU applies the first vehicle speed coefficient Ca to the third vehicle speed coefficient Cc, the dew-point temperature Td, and the outside temperature Ta to Expression (4), to thereby determine the duty ratio D.

Step 640: The CPU applies the duty ratio D to Expression (5) and Expression (6), to thereby calculate the OFF period Toff and the ON period Ton.

$$Toff=(1-D) \cdot Tcyc \qquad \text{Expression (5)}$$

$$Ton=D \cdot Tcyc \qquad \text{Expression (6)}$$

After that, when the CPU proceeds to Step 610, the value of the execution flag Xexe is "1", and the CPU thus makes a determination of "No" in Step 610, and proceeds to Step 645. In Step 645, the CPU determines whether or not the outside temperature Ta is equal to or lower than the threshold temperature Tath.

When the outside temperature Ta is equal to or lower than the threshold temperature Tath, the CPU makes a determination of "Yes" in Step 645, and proceeds to processing of Step 625 and the subsequent steps. Meanwhile, when the outside temperature Ta is higher than the threshold temperature Tath, the CPU makes a determination of "No" in Step 645, and proceeds to Step 650. In Step 650, the CPU sets the value of the execution flag Xexe to "0", and sets the value of the timer T to "0". After that, the CPU proceeds to Step 695, and temporarily finishes this routine.

<Camera Heater Energization Control Routine>

Figure 7:
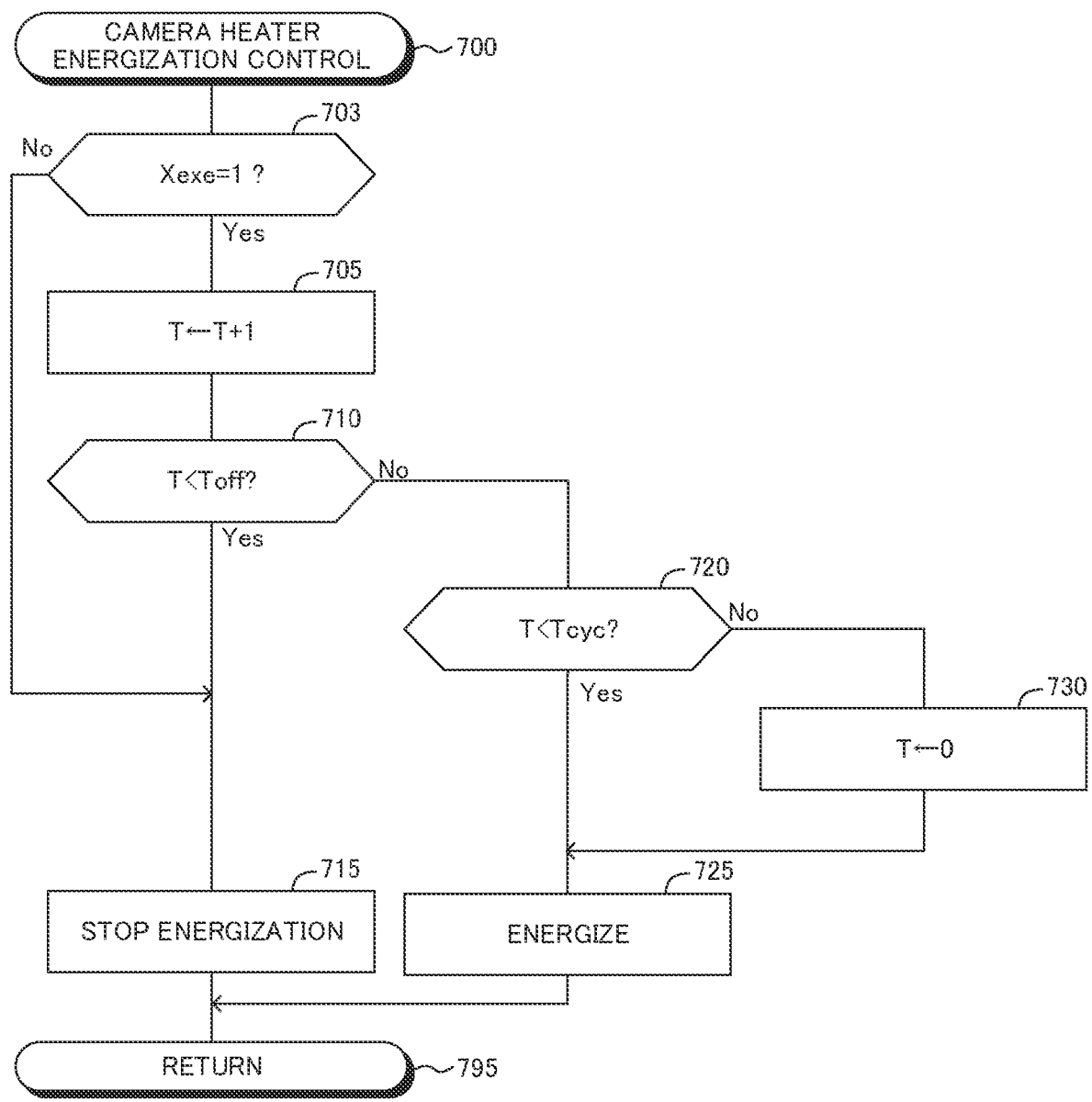
FIG. 7 is a flowchart for illustrating a camera heater energization control routine to be executed by the CPU.

The CPU executes a camera heater energization control routine illustrated in a flowchart of FIG. 7 each time a predetermined period elapses.

Thus, the CPU starts processing from Step 700 of FIG. 7 at a predetermined timing, proceeds to Step 703, and determines whether or not the value of the execution flag Xexe is "1".

When the value of the execution flag Xexe is "1", the CPU makes a determination of "Yes" in Step 703, and executes processing of Step 705 and Step 710 in the stated order.

Step 705: The CPU adds "1" to a value of the timer T.

The timer T is a timer for counting a period elapsed from a time at which the unit period Tcyc starts. The value of the timer T is set to "0" when the unit period Tcyc has elapsed (see Step 730 described below). Further, the value of the timer T is set to "0" in the above-mentioned Step 620 and Step 650, and through the above-mentioned initial routine.

Step 710: The CPU determines whether or not the period indicated by the timer T is shorter than the OFF period Toff.

When the period indicated by the timer T is shorter than the OFF period Toff, the CPU makes a determination of "Yes" in Step 710, and proceeds to Step 715. In Step 715, the CPU stops the energization to the camera heater 24, proceeds to Step 795, and temporarily finishes this routine.

Meanwhile, when the period indicated by the timer T is equal to or longer than the OFF period Toff, the CPU makes a determination of "No" in Step 710, and proceeds to Step 720. In Step 720, the CPU determines whether or not the period indicated by the timer T is shorter than the unit period Tcyc.

When the period indicated by the timer T is shorter than the unit period Tcyc, the CPU makes a determination of "Yes" in Step 720, and proceeds to Step 725. In Step 725, the CPU applies the predetermined voltage Vc to the camera heater 24, to thereby energize the camera heater 24. After that, the CPU proceeds to Step 795, and temporarily finishes this routine.

Meanwhile, when the timer T is equal to or longer than the unit period Tcyc, the CPU makes a determination of "No" in Step 720, proceeds to Step 730, and sets the value of the timer to "0". After that, the CPU proceeds to Step 725, energizes the camera heater 24, proceeds to Step 795, and temporarily finishes this routine.

When the CPU proceeds to Step 703, and the value of the execution flag Xexe is "0", the CPU makes a determination of "No" in Step 703, proceeds to Step 715, and stops the energization to the camera heater 24. After that, the CPU proceeds to Step 795, and temporarily finishes this routine.

With the processing described above, the CPU can reliably prevent the temperature of the image capturing transparent region 101a from falling below the dew-point temperature Td, and can also prevent the camera heater 24 from wastefully consuming the electric power due to heating of the image capturing transparent region 101a to a temperature that is excessively higher than the dew-point temperature Td.

The present disclosure is not limited to the above-mentioned at least one embodiment, and various modification examples can be adopted within the scope of the present disclosure.

First Modification Example

In a first modification example, the voltage Vc to be applied to the camera heater 24 is variable, and the ECU 30 determines the voltage Vc so that the camera heater 24 is energized at the defogging electric power Wc.

In the first modification example, a voltage determination routine for determining the voltage Vc is executed in place of the duty ratio determination routine. Further, the camera heater energization control in the first modification example is different from that in the at least one embodiment in a point that the energization control is not executed in accordance with the OFF period Toff and the ON period Ton, but the voltage Vc determined by the voltage determination routine is applied to the camera heater 24.

<Voltage Determination Routine>

Figure 8:
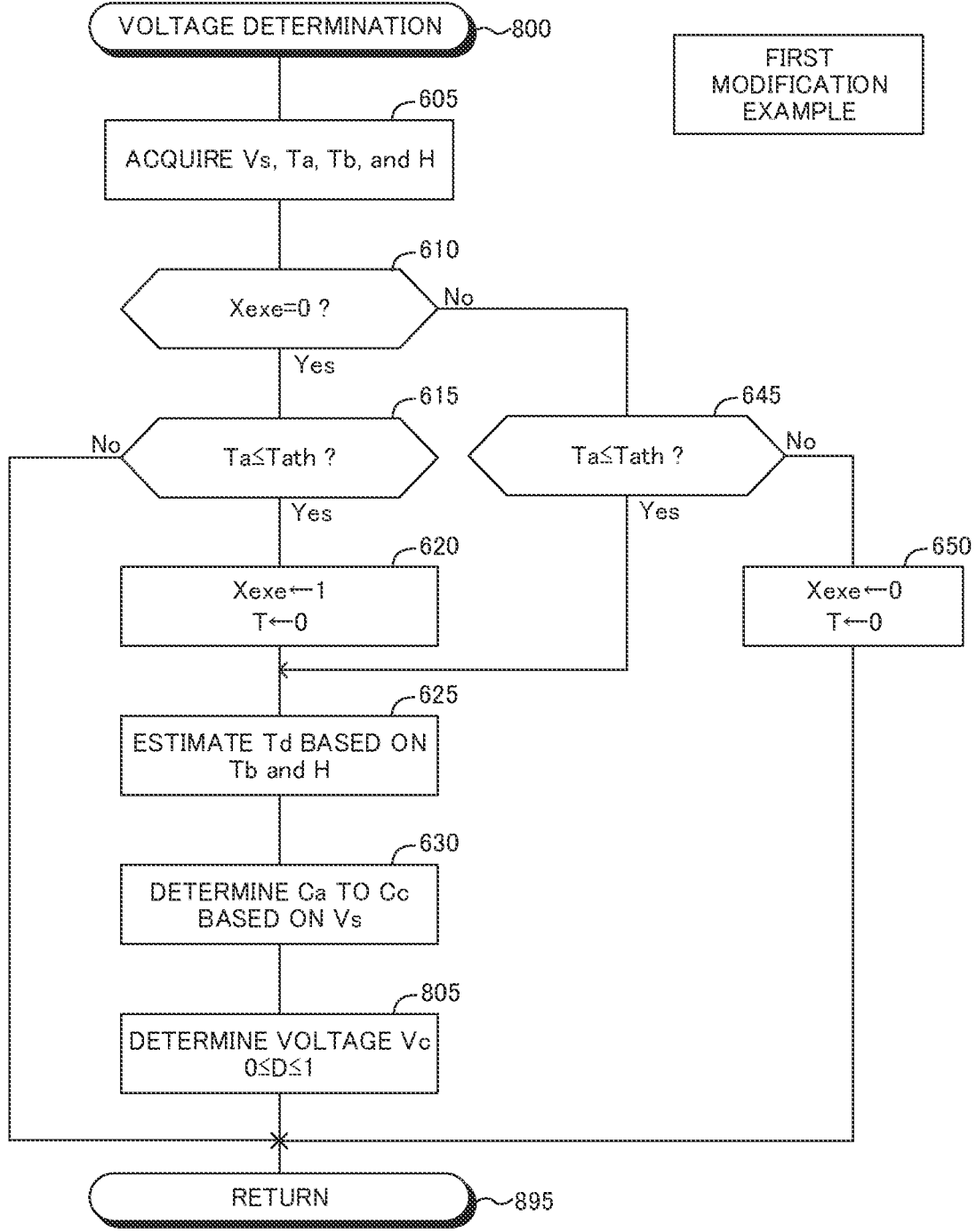
FIG. 8 is a flowchart for illustrating a voltage determination routine to be executed by a CPU in a first modification example of the at least one embodiment of the present disclosure.

With reference to FIG. 8, description is now given of the voltage determination routine in the first modification example. In FIG. 8, a step in which the same processing as that of the step of FIG. 6 is executed is denoted by the same reference numeral as the reference numeral used in FIG. 6, and description thereof is omitted.

The CPU starts processing from Step 800 of FIG. 8 at a predetermined timing, executes the processing of Step 605 of FIG. 8, makes the determination "Yes" in each of Step 610 and Step 615 of FIG. 8, and executes the processing of Step 620 to Step 630 of FIG. 8. The CPU executes the processing of Step 630 of FIG. 8, executes processing of Step 805, proceeds to Step 895, and temporarily finishes this routine.

Step 805: The CPU applies the first vehicle speed coefficient Ca to the third vehicle speed coefficient Cc, the dew-point temperature Td, and the outside temperature Ta to Expression (7), to thereby determine the voltage Vc.

$$Vc = \sqrt{\frac{R(Tg - Ca \times Ta - Cc)}{Cb}} \quad (7)$$

In the first modification example, the unit period Tcyc is not set, and the voltage Vc determined in this routine is always applied to the camera heater 24 in the defogging control. The electric power W of the camera heater 24 is given by Expression (8). Expression (7) is obtained by assigning Expression (8) to Expression (2) and arranging Expression (2) to solve the expression for the voltage Vc.

$$W = \frac{Vc^2}{R} \quad (8)$$

In a period from the determination of the voltage Vc in Step 805 to the determination of the voltage Vc through the next execution of this routine, the CPU continues to apply, to the camera heater 24, the voltage Vc determined in this routine for the current time.

Second Modification Example

In the at least one embodiment, the CPU may apply "a target temperature Ttgt obtained by adding a predetermined temperature (for example, 2° C.) to the dew-point temperature Td" in place of the dew-point temperature Td, to Expression (4), to thereby determine the duty ratio D. The target temperature Ttgt is only required to be a value equal to or higher than the dew-point temperature Td, and the target temperature Ttgt may be the dew-point temperature Td. Thus, it can also be described that the at least one embodiment uses the dew-point temperature Td as the target temperature Ttgt. In the first modification example, the CPU may apply the target temperature Ttgt in place of the dew-point temperature Td to Expression (7), to thereby determine the voltage Vc.

Third Modification Example

In the at least one embodiment, the vehicle VA includes the inside humidity sensor 34, and the CPU acquires the inside humidity H based on the signal from the inside humidity sensor 34, but the method of acquiring the inside humidity H is not limited to this example. In a third modification example, description is given of a method of acquiring, by the CPU, the inside humidity H without using the inside humidity sensor 34.

As an example, the CPU may obtain through calculation the inside humidity H based on an air volume of the air conditioner, an absolute humidity of air passing through an evaporator, an occupant humidification amount set in advance, and the number of occupants. Details of the processing of acquiring the inside humidity H is described in Japanese Patent Application Laid-open No. Hei 07-285312, and a detailed description is therefore omitted.

Further, under such assumption that the amount of water per unit area is the same between inside and outside the cabin, the CPU may acquire meteorological information including the outside temperature and the outside humidity, to thereby obtain the inside humidity H through calculation based on the outside temperature, the outside humidity, and the inside temperature. Details of the processing of acquiring the inside humidity H is described in Japanese Patent Application Laid-open No. 2015-74364, and a detailed description is therefore omitted.

Fourth Modification Example

The camera sensor 22 may capture an image of the outside of the vehicle VA from the inside of the vehicle VA through an image capturing transparent region being a part of a rear window 102 (see FIG. 1).

What is claimed is:

1. A heater control device, comprising:
    a camera sensor configured to capture an image of an outside of a vehicle from an inside of the vehicle through an image capturing transparent region being a partial region of a window glass of the vehicle;
    a camera heater configured to generate heat by being energized, and to heat the image capturing transparent region with the generated heat; and
    a control unit configured to control the energization to the camera heater,
    wherein the control unit is configured to:
        estimate a dew point temperature based on an inside temperature being a temperature inside the vehicle and an inside humidity being a humidity inside the vehicle;
        apply, to a correlation which is set in advance between an outside temperature being a temperature outside the vehicle, a vehicle speed being a speed of the vehicle, and energization electric power for energizing the camera heater, and a temperature of the image capturing transparent region corresponding to the outside temperature, the vehicle speed, and the energization electric power, the outside temperature at a current time, the vehicle speed at the current time, and a target temperature equal to or higher than the dew-point temperature to thereby determine defogging electric power for maintaining the temperature of the image capturing transparent region at the target temperature so that the temperature of the image capturing transparent region is prevented from falling below the dew-point temperature; and
        energize the camera heater at the defogging electric power,
    wherein the correlation is represented by an equation in which the temperature of the image capturing transparent region is equal to a sum of a value obtained by multiplying the outside temperature by a first vehicle speed coefficient corresponding to the vehicle speed, a value obtained by multiplying the energization electric power by a second vehicle speed coefficient corresponding to the vehicle speed, and a third vehicle speed coefficient corresponding to the vehicle speed, and
    wherein the control unit is configured to determine, as the defogging electric power, the energization electric power obtained by setting the first vehicle speed coefficient, the second vehicle speed coefficient, and the third vehicle speed coefficient of the equation to values corresponding to the vehicle speed at the current time, assigning the target temperature to the temperature of the image capturing transparent region of the equation, and assigning the outside temperature at the current time to the outside temperature of the equation.

2. The heater control device according to claim 1, wherein the control unit is configured to:
    divide a predetermined unit period into a non-energization period in which the camera heater is prevented from being energized and an energization period in which a constant voltage is applied to the camera heater to energize the camera heater, and start a new predetermined unit period when the predetermined unit period ends, to thereby control the energization to the camera heater; and
    determine the non-energization period and the energization period so that the energization electric power matches the defogging electric power.

3. The heater control device according to claim 1, wherein the control unit is configured to:
    change a voltage to be applied to the camera heater; and
    determine the voltage so that the energization electric power matches the defogging electric power.

* * * * *